(12) United States Patent
Haskayne

(10) Patent No.: US 7,574,934 B2
(45) Date of Patent: Aug. 18, 2009

(54) MISSING HOLE DETECTOR

(76) Inventor: Derek S. Haskayne, 7286 E. Villanueva, Orange, CA (US) 92867

( * ) Notice: Subject to any disclaimer, the term of this patent is extended or adjusted under 35 U.S.C. 154(b) by 512 days.

(21) Appl. No.: 11/373,657

(22) Filed: Mar. 13, 2006

(65) Prior Publication Data

US 2007/0210919 A1  Sep. 13, 2007

(51) Int. Cl.
*G01M 19/00* (2006.01)
(52) U.S. Cl. ........................ 73/865.8; 209/601
(58) Field of Classification Search .................. 73/104, 73/865.8

See application file for complete search history.

(56) References Cited

U.S. PATENT DOCUMENTS 3,618,396 A * 11/1971 Julien ........................ 73/865.8
5,949,352 A * 9/1999 Ferrari .................. 340/870.16

* cited by examiner

*Primary Examiner*—Hezron Williams
*Assistant Examiner*—Mark Shabman
(74) *Attorney, Agent, or Firm*—Moland C. Fischer

(57) ABSTRACT

A missing hole detector to detect a missing or misplaced hole in a (e.g., sheet metal) workpiece. The missing hole detector is preferably located at a punching station within the upper turret of a CNC punch press. A pushing force generated during the downstroke of a ram causes a test probe of the missing hole detector to move towards the workpiece under test. A switching circuit connected to a transmitter is responsive to the movement of the test probe. If the test probe is moved into a hole so as to penetrate the workpiece, the switching circuit is opened and the transmitter is disabled. If the test probe is otherwise moved into contact with but fails to penetrate the workpiece because a hole is absent or misplaced, the switching circuit is closed and the transmitter is energized. The transmitter now transmits a stream of data by way of an RF wireless communication path to a receiver. The receiver is adapted to emit a visual and/or audible warning signal and/or cause the punch press to be shut down as a sign that a missing or misplaced hole has been detected in the workpiece.

20 Claims, 9 Drawing Sheets

MISSING HOLE DETECTOR

BACKGROUND OF THE INVENTION

1. Field of the Invention

This invention relates to a missing hole detector to be preferably located in a punching station at the upper turret of a conventional CNC punch press and adapted to detect missing or misplaced holes in a (e.g., sheet metal) workpiece that is supported at the lower turret of the punch press below the missing hole detector.

2. Background Art

It has long been known in the sheet metal industry to inspect 2-dimensional sheet metal parts for the presence and location of holes so that fasteners can ultimately be inserted into the holes during assembly to complete a variety of finished metal products. Manual inspection techniques have often been used which typically involve a string and a micrometer to verify the position of each hole relative to the edge of a metal part. However, where there is a multitude of holes is to be verified and/or where the holes have a very small diameter, it is a laborious and time-consuming task to have to manually check each hole and then provide an indication in the event that a hole is determined to be missing or misplaced or of insufficient size to receive a fastener.

Accordingly, automatic electro-optical and optical scanning and inspection systems have been proposed to increase the efficiency and lower the time associated with inspecting sheet metal parts for holes. In some cases, a special frame or table is required by which to subject the part to a complex set of movements. In other cases, expensive optical and/or computing equipment is necessary to make the mathematical calculations required to identify the presence and locations of holes in the parts undergoing testing. Still further, the large size of the typical automated inspection systems necessitates that correspondingly large amounts of space be set aside to perform the inspection process.

One example of an optical inspection system for automatically detecting holes in a flat metal workpiece is available by referring to U.S. Pat. No. 4,711,579 issued Dec. 8, 1987 to Blair E. Wilkinson.

What is desired is a compact, relatively low cost and easy-to-use automated device for detecting missing or misplaced holes in a sheet metal workpiece without the cost, complexity and space consumption that have heretofore been associated with conventional electro-optical and optical scanning and inspection apparatus.

SUMMARY OF THE INVENTION

In general terms, a missing hole detector is disclosed by which to detect missing or misplaced holes in a (e.g., sheet metal) workpiece undergoing testing. The missing hole detector has particular application to be located in a punching station at the upper turret of a conventional CNC punch press so as to detect holes in a workpiece that is carried by the lower turret of the punch press below the detector. During its downstroke, a ram of the punch press applies an axial pushing force against an end cap of the missing hole detector. The pushing force is transmitted from the end cap to a probe holder. The probe holder carries a test probe to be advanced towards the workpiece under test. The probe will either enter the hole and penetrate the workpiece in the event that a hole is present according to plan or move into contact with but fail to penetrate the workpiece in the event the hole is absent or misplaced from its intended location.

The missing hole detector includes a series switching circuit that is responsive to the movement of the test probe towards the workpiece under test. The switching circuit includes first and second (e.g., snap action) switches that are connected in electrical series with each other and with an output plug. The output plug is connected to a transmitter that is adapted to transmit an RF signal containing a serial stream of data to a receiver by way of a wireless communication path. The data stream provided by the transmitter to the receiver is indicative of a missing (or misplaced) hole condition in the workpiece under test. The receiver is capable of emitting a visual and/or an audible warning signal in the event that the test probe fails to enter a hole and penetrate the workpiece. The receiver may also generate a signal to cause the punch press to shut down when a missing hole condition is detected.

Each of the first and second series connected switches of the switching circuit of the missing hole detector has a spring-like switch arm which carries a roller at one end thereof. The roller of the switch arm of the first switch communicates with an upper cam, and the roller of the switch arm of the second switch communicates with a lower cam. Each of the upper and lower cams has a raised and a recessed switching flat. The upper and lower cams move relative to the first and second switches as the test probe is advanced by the probe holder towards the workpiece under test in response to the pushing force applied to the end cap. With the missing hole detector at rest prior to the application of a ram pushing force against the end cap, the rollers of the first and second switches are located on the switching flats of the upper and lower cams such that the first switch is in an open switch position and the second switch is in a closed switch position. Therefore, the series switching circuit to the output plug has an open circuit condition and the transmitter is inactive. During the application of a ram pushing force to the end cap to cause the probe holder to move the test probe into a hole so as to penetrate the workpiece, the rollers of the first and second switches roll along the switching flats of the upper and lower cams such that the first switch is in a closed switch position and the second switch is in an open switch position. Therefore, the series switching circuit to the output plug still has an open circuit condition and the transmitter remains inactive. However, should the test probe be moved into contact with the workpiece under test but fail to penetrate the workpiece because of the absence of a hole therein, then the rollers of the first and second switches are relocated on the switching flats of the upper and lower cams such that each switch is now in a closed switch position. The series switching circuit to the output plug now has a closed circuit condition, whereby the transmitter connected to the output plug is energized for transmitting a signal to the receiver that is indicative of the missing hole condition.

DESCRIPTION OF THE PREFERRED EMBODIMENT

Figure 1:
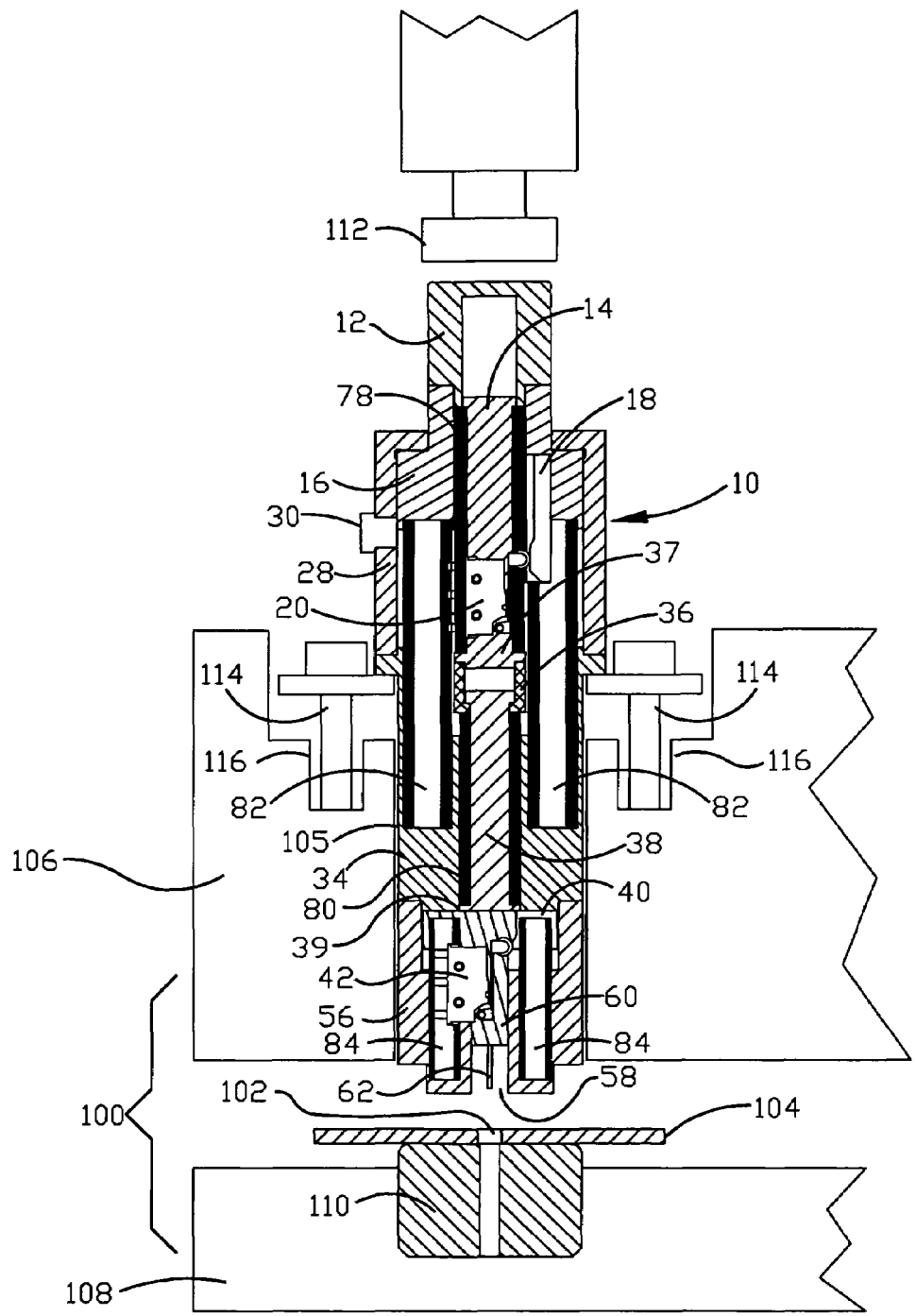
FIG. 1 shows a preferred embodiment of the missing hole detector of this invention in cross-section and at an at-rest condition.
Figure 9:
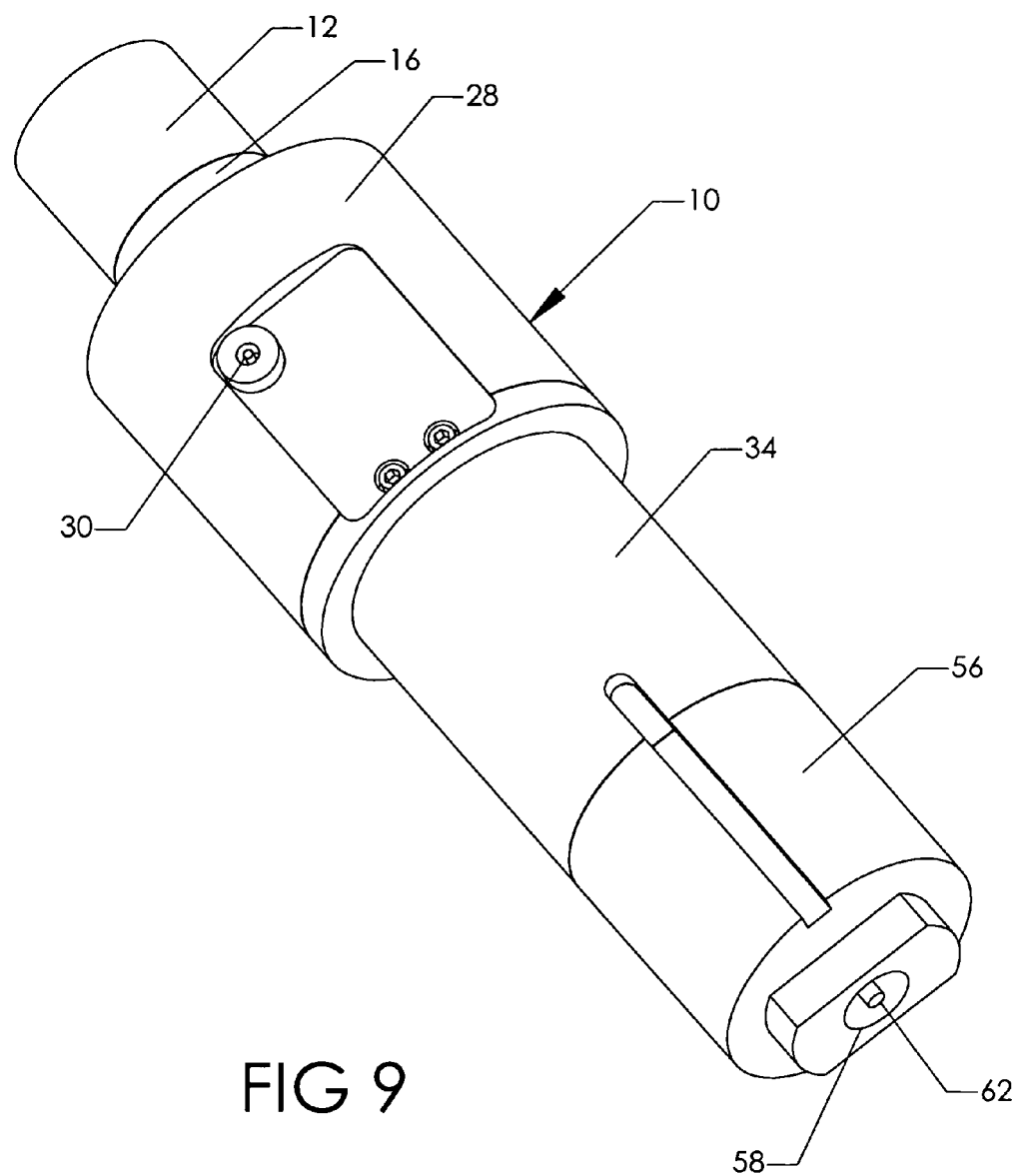
FIG. 9 shows a perspective view of the missing hole detector of the present invention.

FIG. 1 of the drawings shows a missing hole detector 10 (best shown in FIG. 9) according to a preferred embodiment of this invention that is capable of detecting and indicating the absence and location of holes 102 in a (e.g., sheet metal) workpiece 104. By way of one example, the missing hole detector 10 is located at a punching station 105 within the upper turret 106 of a conventional CNC computer numerically controlled punch press 100. The workpiece 104 is supported below detector 10 upon a suitable die 110 that is received within an opposing station of the lower turret 108 of the punch press 100.

The missing hole detector 10 includes an end cap 12 to which a ram 112 of the punch press 100 applies an axial pushing force at those times when the workpiece 104 is to be tested for the presence and location of holes. FIG. 1 shows the missing hole detector 10 at rest with the ram 112 at the top of its stroke and in spaced alignment with the end cap 12 before the ram begins the downward stroke of its cycle. The end cap 12 is located above an upper spring retainer 14. The upper spring retainer 14 is surrounded by a slidable upper punch body 16. As will be explained when referring to FIG. 2, an axial pushing force applied to end cap 12 is transferred to the upper punch body 16 whereby each of the end cap 12 and the punch body 16 will be displaced downwardly with the spring retainer 14. Projecting downwardly from and movable with the upper punch body 16 is an upper cam 18 having a pair of switching flats by which to control the operation of a stationary first snap action switch 20 depending upon the displacement of the upper cam 18 relative to switch 20 in response to the axial pushing force that is applied to end cap 12 and upper punch body 16.

Figure 2:
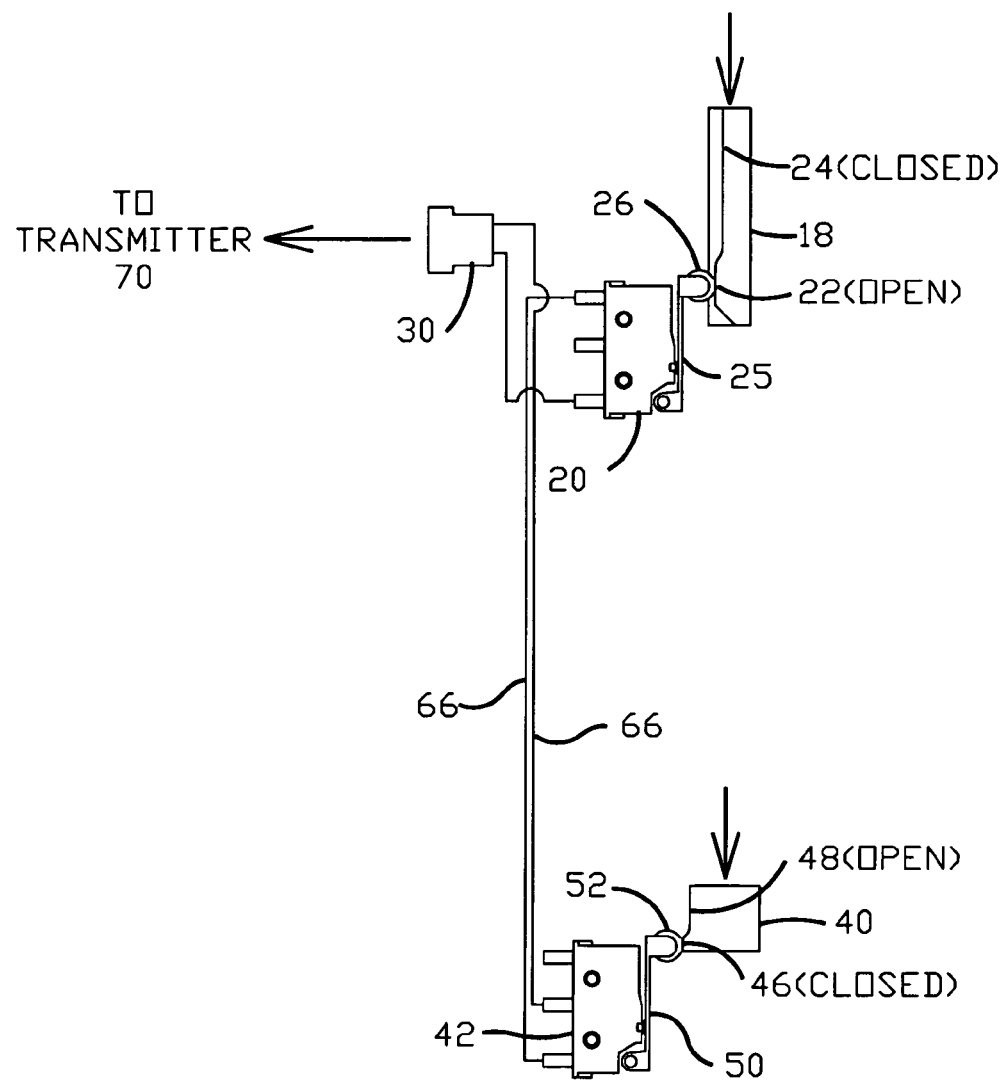
FIG. 2 shows a series switching circuit of the missing hole detector of FIG. 1 that is responsive to the movement of a test probe towards a workpiece under test to determine if a hole is present or misplaced therein.

More particularly, and referring briefly to FIG. 2 of the drawings, details of a switching circuit are shown within which the first snap action switch 20 is connected so as to interact with the upper cam 18. Upper cam 18 has a raised switching flat 22 and a recessed switching flat 24 for switching the first snap action switch 20. As will be described in greater detail hereinafter, the raised switching flat 22 of upper cam 18 sets switch 20 in an open switch position, while the recessed switching flat 24 sets switch 20 in a closed switch position.

As just described, an axial pushing force applied from the ram 112 to the end cap 12 is transferred to the upper punch body 16 and to the upper spring retainer 14. Thus, the upper cam 18 carried by the upper punch body 16 will move downwardly relative to the stationary snap action switch 20 towards the workpiece 104. Snap action switch 20 is preferably a conventional rocker-type switch having a spring-like rocker switch arm 25. One end of the switch arm 25 is fixedly attached to the body of the switch 20, and the opposite free end of switch arm 25 carries a roller 26. The roller 26 is capable of riding over the upper cam 18 along the raised and recessed switching flats 22 and 24 thereof corresponding to the open and closed switch positions as the upper cam 18 is moved past the stationary switch 20.

The upper spring retainer 14, the upper punch body 16, the upper cam 18 connected to and projecting downwardly from punch body 16, and the first snap action switch 20 which interacts with the cam 18 are all enclosed within an outer casing 28. The upper punch body 16 is adapted to slide back and forth (i.e., up and down) through the outer casing 28 along with the upper spring retainer 14 and the upper cam 18 in response to the axial pushing force that is applied to and removed from end cap 12 during the ram cycle. That is, as the upper punch body 16 slides back and forth through the outer casing 28, the upper cam 18 carried thereby will likewise move back and forth (i.e., down and up) relative to the roller 26 of snap action switch 20 to control the switch position thereof. An electrical plug 30 is mounted in the outer casing 28 for a purpose that will soon be described.

Located below the outer casing 28 is an intermediate punch body 34. The intermediate punch body 34 encloses a plunger 36 and a lower spring retainer 38. The upper and lower spring retainers 14 and 38 extend through the missing hole detector 10 in spaced axial alignment with one another so that the pushing force applied to end cap 12 is transferred to a probe holder 60. The plunger 36 is located between the upper and lower spring retainers 14 and 38. The probe holder 60 supports a lower cam 40 having a pair of switching flats 46 and 48 by which to control the operation of a second stationary snap action switch 42 as the lower cam 40 is displaced with the probe holder 60 in response to the pushing force transmitted thereto via the upper and lower spring retainers 14 and 38.

Referring once again to FIG. 2 and to the switching circuit thereof, the second snap action switch 42 is shown interacting with the lower cam 40. Lower cam 40 has a raised switching flat 46 and a recessed switching flat 48 for switching the second snap action switch 42. As will also be described in greater detail hereinafter, the raised switching flat 46 of lower cam 40 sets switch 42 in a closed switch position, while the recessed switching flat 48 sets switch 42 in an open switch position. The second snap action switch 42 is held stationary relative to the probe holder 60 and the lower cam 40 carried thereby. The second snap action switch 42 is also preferably a conventional rocker-type switch and includes a spring-like rocker switch arm 50. One end of switch arm 50 is fixedly attached to the body of switch 42, and the opposite free end of switch arm 50 carries a roller 52. The roller 52 is capable of riding over the lower cam 40 along the raised and recessed switching flats 46 and 48 thereof corresponding to closed and open switch positions as the lower cam 40 is moved past the stationary second snap action switch 42.

It may be appreciated that the raised switching flat 22 of the upper cam 18 (of FIG. 2) and the recessed switching flat 48 of the lower cam 40 represent open switch positions for the respective first and second snap action switches 20 and 42. It may also be appreciated that the recessed switching flat 24 of the upper cam 18 and the raised switching flat 46 of the lower cam 40 represent closed switch positions for the first and second snap action switches 20 and 42. The raised switching flat 46 of the lower cam 40 is substantially shorter than the raised switching flat 22 of the upper cam 18. Thus, the roller 52 of the second snap action switch 42 will only be in momentary contact with the lower cam 40 as the upper and lower cams 18 and 40 are displaced with the upper punch body 16 and the probe holder 60 following the application of an axial pushing force to the end cap 12 of missing hole detector 10. Therefore, and as will soon be explained, the second snap action switch 42 will be quick to switch from its normally closed switch position to an open switch position in the event that a hole is detected in the workpiece. However, the roller 26 of the first snap action switch 18 will remain in contact with the raised flat 22 of the upper cam 18 for a longer time during which the first snap action switch 20 will stay in its normally open position.

Located at the bottom of the missing hole detector 10 below the intermediate punch body 34 is a lower punch body 56. The lower punch body 56 has an axially extending channel 58 within which to receive probe holder 60 such that probe holder 60 moves axially relative to the lower punch body 56 to pass through channel 58. A test probe 62 to be used to test for the presence or absence of a hole 102 formed in the workpiece 104 lying upon the die 110 below the lower punch body 56 of missing hole detector 10 projects downwardly into the channel 58 from the probe holder 60. The probe 62 is preferably a solid cylindrical rod. The position of probe 62 within the probe holder 60 can be adjusted depending upon the thickness of the workpiece to be tested. That is, a set screw (not shown), or the like, may be loosened to slidably adjust the position of the probe 62 projecting from the probe holder 60 or to allow the substitution of different probes so that a larger or smaller diameter probe 62 will be available within channel 58 to test for holes of different diameter and shape. The probe holder 60 and the probe 62 carried thereby will move downwardly through the lower punch body 56 of missing hole detector 10 when the lower spring retainer 38 is moved downwardly through the intermediate punch body 34 following the application of a pushing force to the end cap 12 and upper spring retainer 14. In this manner, the probe 62 will be advanced towards the workpiece and outwardly of the channel 58 to determine whether a hole 102 is present or misplaced in the workpiece 104.

Figure 7:
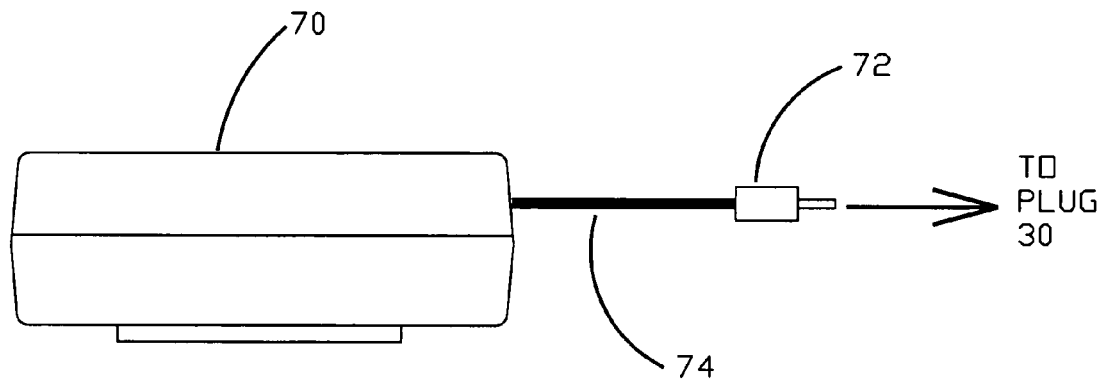
FIG. 7 shows a transmitter connected to the series switching circuit of FIG. 2 of the missing hole detector to transmit a signal over a wireless communication path to indicate a missing hole condition when the test probe fails to penetrate the workpiece because of the absence of a hole therein.

As is best shown in FIG. 2, the first and second snap action switches 20 and 42 are connected in an electrical series circuit with one another and with the plug 30 that is mounted at the outer casing 28 by means of electrical wires 66. Referring now to FIG. 7 of the drawings, a transmitter 70 is shown to be interconnected to the missing hold detector 10 at the plug 30 thereof. The transmitter 70 includes a complementary electrical plug 72 that is mated to the plug 30 via an electrical cable 74. The transmitter 70 of FIG. 7 is adapted to transmit an RF signal to a receiver 76 (of FIG. 8) over a wireless communication path. By way of example, a suitable wireless transmitter 70 to communicate with receiver 76 is an RF transmitter that has a frequency of 418 MHz and is available from Globalab.com under Model No. KT4A. By way of further example, a suitable receiver 76 to be matched to transmitter 70 is also available from Globalab.com under Part No. KR4B.

The missing hole detector 10 includes a plurality of springs, each of which is initially in a relaxed, expanded condition when the ram 112 is located in spaced alignment above the end cap 12 as shown in the at-rest condition of the detector 10 in FIG. 1. An upper spring 78 lies in surrounding engagement with the upper spring retainer 14 and extends between end cap 12 and a seat 37 at the bottom of upper spring retainer 14. The upper spring 78 pushes against the seat 37 and translates a linear pushing force applied by the ram 112 to the end cap 12 to a lower spring 80. The lower spring 80 lies in spaced axial alignment with the upper spring 78 in surrounding engagement with the lower spring retainer 38. The plunger 36 lies between the seat 37 of upper spring retainer 14 and the top of the lower spring 80. The lower spring 80 extends from the plunger 36 to a seat 39 at the bottom of lower spring retainer 38. The pushing force applied to end cap 12 is transmitted to the lower spring 80 via plunger 36 by which to correspondingly push the probe holder 60 and the probe 62 carried thereby towards the workpiece 104.

A pair of intermediate springs 82 extend between the upper punch body 16 and the intermediate punch body 34 at opposite sides of the upper and lower springs 78 and 80. The intermediate springs 82 support the weight of the end cap 12, upper spring retainer 14, and upper punch body 16 during the at-rest configuration of the missing hole detector 10 as shown in FIG. 1 prior to the application of a ram pushing force to end cap 12.

A pair of probe return springs 84 extend from the probe holder 60 towards the bottom of the lower punch body 56. The probe return springs 84 are aligned to engage the bottom of lower punch body 56 so as to be capable of urging the probe holder 60 and the probe 62 away from the workpiece 104 after the ram 112 has fully cycled and the pushing force is removed from the end cap 12. Each of the upper and lower springs 78 and 80 has a greater spring constant than the spring constant of the probe return springs 84 so as to be able to overcome the probe return springs 84 for moving the probe 62 towards the workpiece 104 to detect a hole therein when the pushing force is applied to ram 112.

A pair of turret lifter springs 114, which are common to a CNC punch press and lie outside the missing hole detector 10, extend between the intermediate punch body 34 and existing spring cavities 116 of the upper turret 106 of punch press 100. The turret lifter springs 114 provide vertical support for the missing hole detector 10 at the intermediate punch body 34 thereof when detector 10 is located within the punching station 105 of upper turret 106.

As indicated above, the first and second snap action switches 20 and 42 of missing hole detector 10 are connected in an electrical series circuit (of FIG. 2). As also disclosed above, with detector 10 at rest in the manner shown in FIG. 1, the upper cam 18 is positioned relative to the first switch 20 such that the first switch 20 is normally open. Therefore, in the at-rest condition of FIG. 1, the series circuit of FIG. 2 including the first switch 20, the second switch 42, the plug 30, and wires 66 has an open circuit condition such that the transmitter 70 (of FIG. 7) is disabled and no warning signal is provided.

Figure 3:
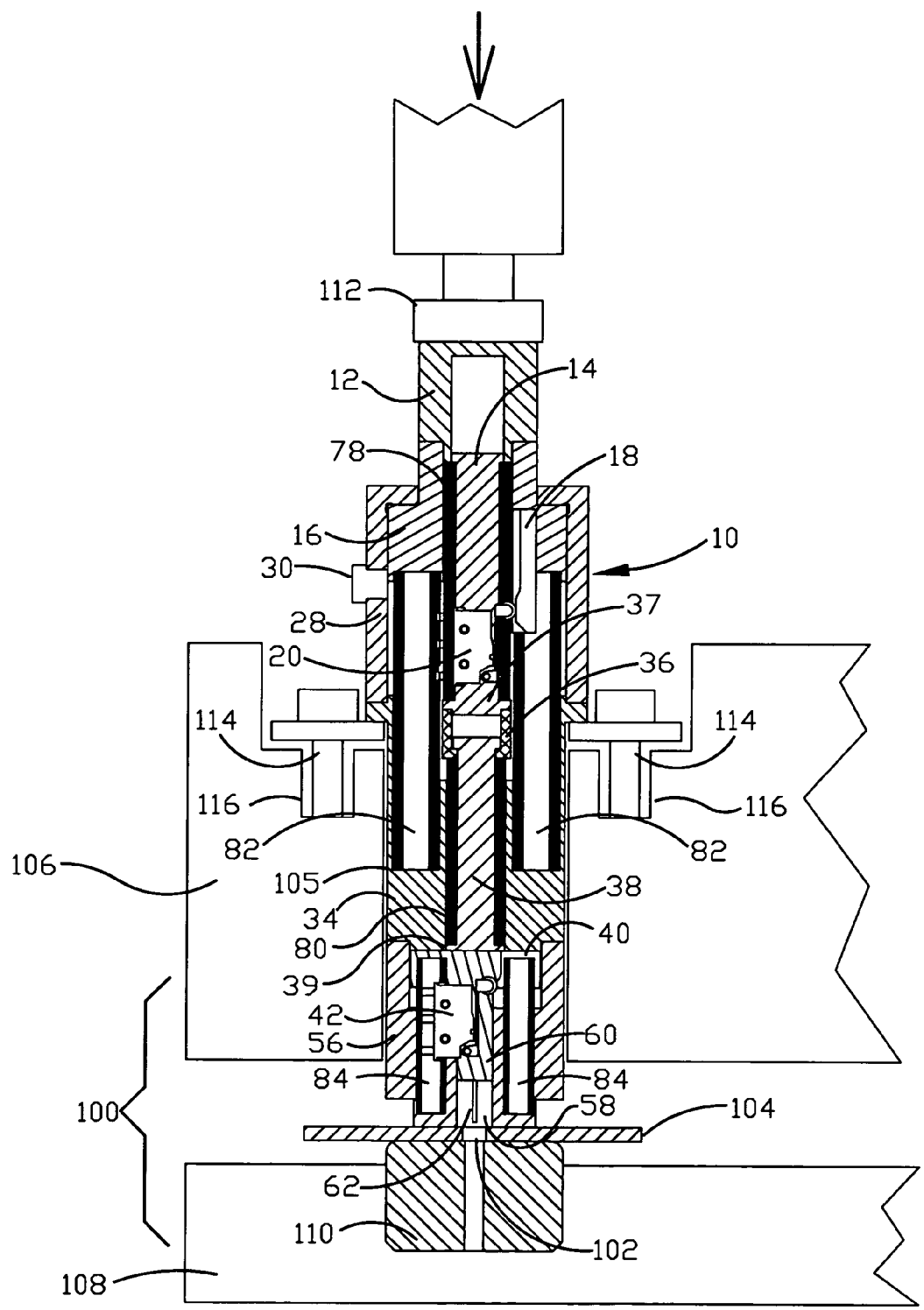
FIG. 3 shows the missing hole detector seated upon the workpiece under test with the test probe thereof located immediately above a hole formed in the workpiece.

Turning to FIG. 3 of the drawings, the ram 112 is shown after moving downwardly and into contact with the end cap 12 of missing hole detector 10 to apply an initial pressure thereagainst at the beginning of the downstroke. In this case, the missing hole detector 10, as a unit, is pushed downwardly through the punching station 105 at the upper turret 106 of punch press 100. Accordingly, the turret lifter springs 114 are compressed within spring cavities 116. That is, the ram pressure is imparted to the turret lifter springs 114 by way of the intermediate punch body 34 moving downwardly into the turret punching station 105, such that springs 114 are stressed within cavities 116. At the same time, the lower punch body 56 is correspondingly pushed downwardly through punching station 105 so as to lie against the workpiece 104 to be tested so that the probe 62 carried by probe holder 60 is now located directly above the workpiece 104. However, as the initial ram pressure is applied to end cap 12 in FIG. 3, the other springs 78, 80, 82 and 84 of missing hole detector 10 are unaffected and remain in their relaxed uncompressed state. Moreover, the positions of the upper and lower cams 18 and 40 are not changed relative to the first and second snap action switches 20 and 42, whereby the first switch 20 will remain in its normally open switch position so that the transmitter 70 (of FIG. 7) continues to be disabled.

Figure 4:
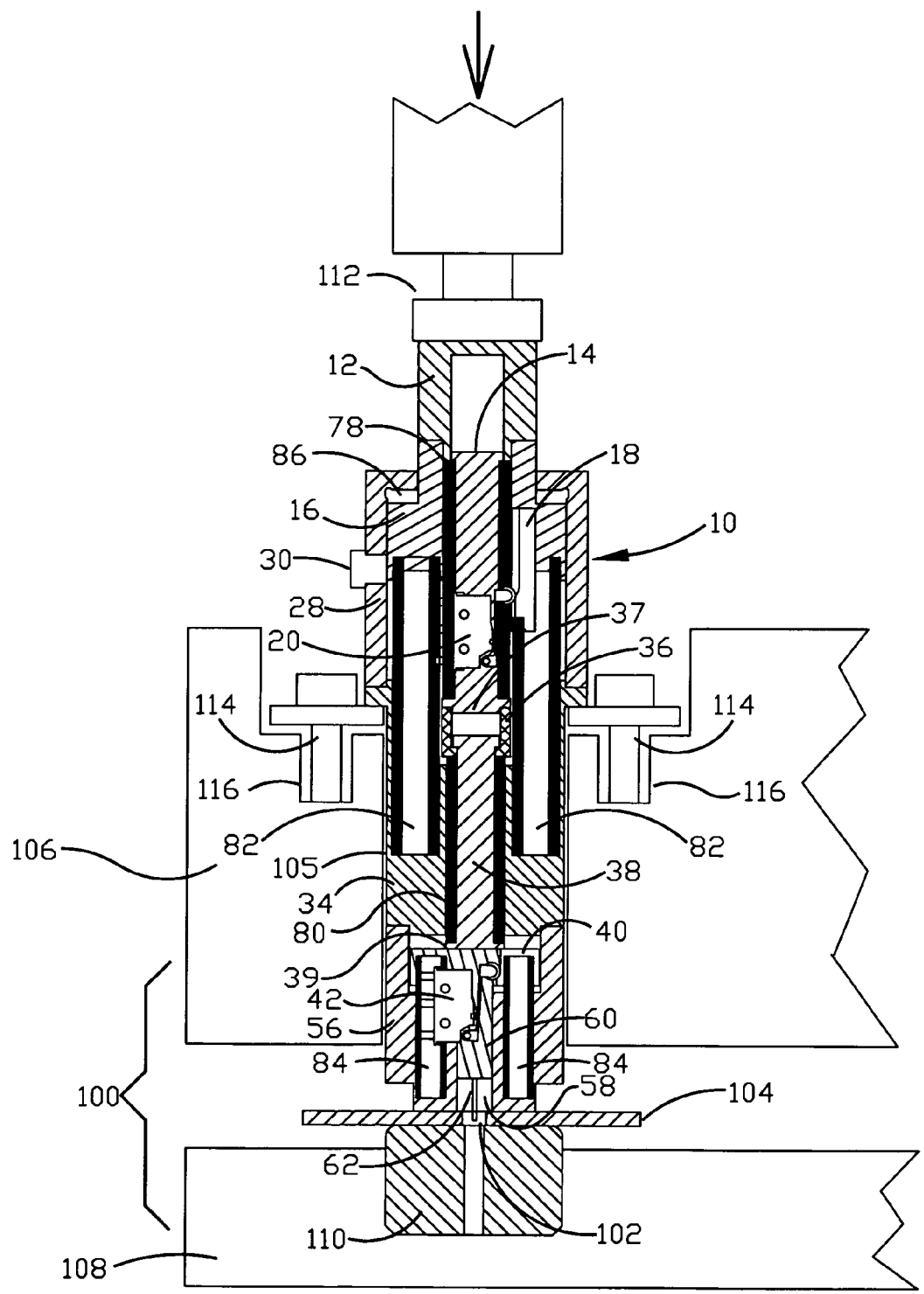
FIG. 4 shows an axial pushing force being applied to the missing hole detector to cause the test probe to move into the hole formed in the workpiece.

Referring now to FIG. 4 of the drawings, the ram 112 continues to move downwardly towards the missing hole detector 10, whereby to increase the ram pressure applied to the end cap 12. The end cap 12 will apply the ram pressure to the upper punch body 16 to cause the upper punch body to move downwardly through the outer casing 28 towards the workpiece 104 so as to leave a gap 86 below outer casing 28. During the increased ram pressure of FIG. 4, the upper and lower springs 78 and 80 remain unaffected and relaxed. However, the downwardly moving upper punch body 16 causes the pair of intermediate springs 82 to begin to compress. Moreover, the ram pressure against end cap 12 is transmitted through the upper and lower springs 78 and 80 and the plunger 36 to cause the axially aligned upper and lower spring retainers 14 and 38 to be pushed downwardly towards the workpiece 104. The downward movement of the spring retainers 14 and 38 is imparted to the probe holder 60 to cause probe holder 60 to also move towards the workpiece 104 and the probe 62 to be advanced through the channel 58 of lower punch body 56. The downwardly moving probe holder 60 overcomes the resistive force of the probe return springs 84, such that springs 84 are now compressed. Provided that the workpiece 104 to be tested has a properly sized and located hole 102, the test probe 62 that is carried by probe holder 60 is now advanced (i.e., pushed) through such hole.

The downwardly moving upper punch body 16 forces the upper cam 18 to move in a corresponding downward direction relative to the first snap action switch 20 such that the roller 26 thereof (of FIG. 2) will ride along the raised switching flat 22 of upper cam 18 (also of FIG. 2). As previously explained, the raised switching flat 22 of upper cam 18 is relatively long so that the roller 26 will remain on the raised flat 22 even as the test probe 62 enters the hole 102. Inasmuch as the raised switching flat 22 of upper cam 18 represents an open switch position, the first switch 20 will remain in its normally open switch position.

The downwardly moving probe holder 60 causes the lower cam 40 to move in a corresponding downward direction relative to the second snap action switch 42 such that the roller 52 thereof (of FIG. 2) will ride over and past the raised switching flat 46 of lower cam 40 (also of FIG. 2). As previously explained, the raised switching flat 46 of lower cam 40 is relatively short so that the roller 52 will drop from the raised switching flat 46 onto the recessed switching flat 48 when the test probe 62 enters the hole 102. Inasmuch as the recessed switching flat 48 of lower cam 40 represents an open switch position, the second switch 42 will now switch from its normally closed switch position to an open switch position.

Accordingly, it can be appreciated that when a hole 102 is detected in the workpiece 104 by means of the probe 62 being moved downwardly and into such hole, each of the stationary first and second snap action switches 20 and 42 will have an open switch position. In this case, the series circuit of FIG. 2 including switches 20 and 42 and plug 30 will remain in an open circuit condition so that the transmitter 70 (of FIG. 7) continues to be disabled such that no warning signal is provided.

It should be recognized that the missing hole detector 10 includes a pair of switches 20 and 42 connected together in a series circuit by means of wires 66 (of FIG. 2). Inasmuch as the second switch 42 has a normally closed switch position with the roller 52 located on the raised switching flat 46, the first switch 20 is required having a normally open switch position with the roller 26 located on the raised switching flat 22 in order to maintain the series circuit in an open circuit condition when the missing hole detector 10 is in the at-rest condition of FIG. 1 prior to testing the workpiece 104 for holes. In this manner, it is possible to avoid energizing the transmitter 70 and constantly generating a warning signal before the ram 112 moves into contact with end cap 12.

Figure 5:
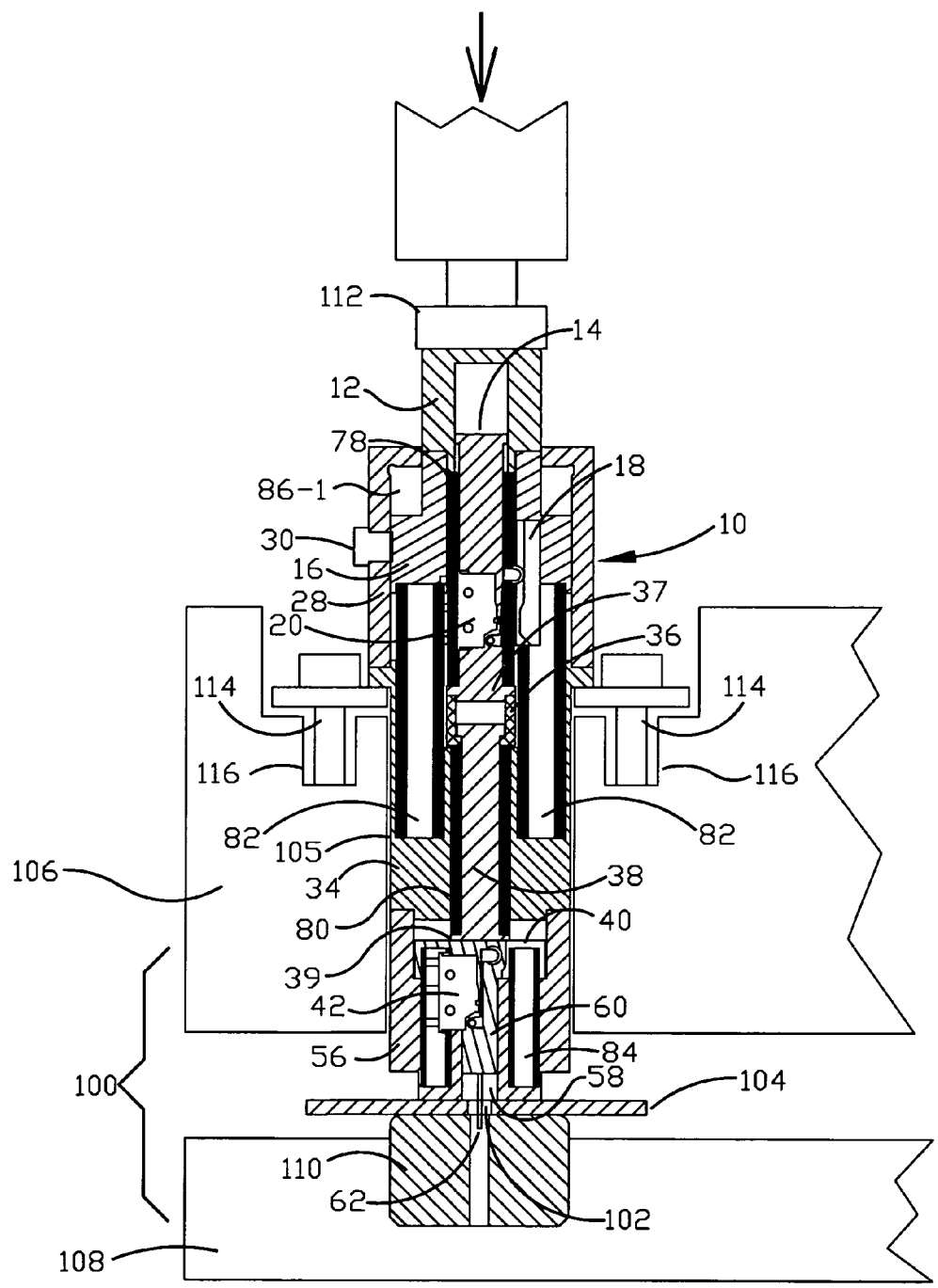
FIG. 5 shows the test probe penetrating the workpiece under test as an increased pushing force is applied to the missing hole detector.

FIG. 5 of the drawings shows the ram 112 at the bottom of its stroke after a full ram cycle has been completed and the maximum ram pressure is applied to the end cap 12 of missing hole detector 10. The ram pressure applied to end cap 12 causes the upper punch body 16 to continue to move downwardly so as to leave a larger gap 86-1 below the outer casing 28. During the maximum ram pressure of FIG. 5, the upper and lower springs 78 and 80 will now be compressed. In this same regard, the intermediate springs 82 and the probe return springs 84 are now fully compressed. The probe holder 60 receives its maximum pushing force via the upper and lower spring retainers 14 and 38 and plunger 36 so as to be advanced through channel 58 and bottom out against the lower punch body 56. The probe 62 carried by probe holder 60 is pushed completely through the hole 102 in order to penetrate the workpiece 104 for receipt by the die 110 lying thereunder.

With the ram 112 at the bottom of its stroke as shown in FIG. 5, the upper cam 18 is pushed downwardly by the upper punch body 16 so that the roller 26 (of FIG. 2) of the first snap action switch 20 will drop down and ride over the recessed switching flat 24 (also of FIG. 2) of the upper cam 18. Likewise, the lower cam 40 is pushed downwardly by the probe holder 60 so that the roller 52 (of FIG. 2) of the second snap action switch 42 is still riding over the recessed switching flat 48 (also of FIG. 2) of the lower cam 40. Accordingly, the first switch 40 will be switched to the closed switch position, and the second switch 42 will remain in the open switch position. The series circuit including the first and second snap action switches 20 and 42 and plug 30 will remain in the open circuit condition, such that the transmitter 70 (of FIG. 7) will not be energized and no warning signal will be generated.

When the ram 112 begins to move upwardly from the bottom of its stroke to begin a new cycle, the axial pushing force previously applied to end cap 112 will be removed. The probe return springs 84 begin to expand and release the energy stored during the period of maximum ram pressure of FIG. 5 so as to urge the probe holder 60 to move upwardly through the channel 58 of the lower punch body 56. The test probe 62 will now be withdrawn from the hole 102 in the workpiece 104 to be pulled upwardly with probe holder 60. The compressed upper and lower springs 78 and 80 as well as the intermediate springs 82 will also expand and drive the missing hole detector 10 back towards its initial at-rest condition shown in FIG. 1 until the ram 112 reaches the top of its next stroke at which to apply another axial pushing force to the end cap 12 to test for the presence and location of a different hole in the workpiece 104.

Figure 6:
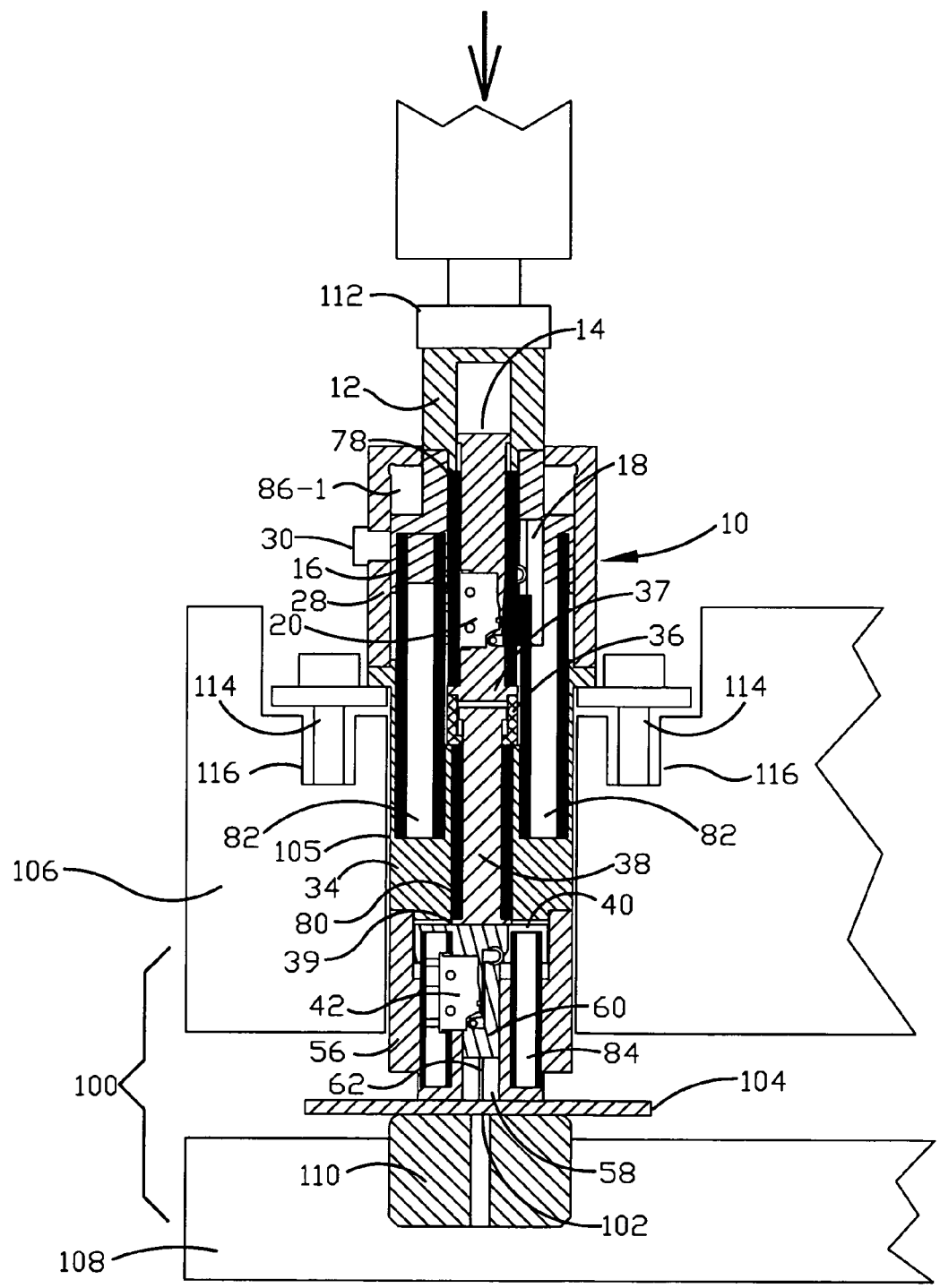
FIG. 6 shows the test probe moved into contact with but failing to penetrate the workpiece under test because of the absence of a hole in the workpiece.

FIG. 6 of the drawings shows the missing hole detector 10 when a hole is the wrong size or missing from or misplaced in the workpiece 104 under test. In this case, as the ram 112 applies the pushing force to end cap 12, the upper punch body 16 is moved downwardly through the outer casing 28. The pushing force is transmitted to the probe holder 60 which begins to move downwardly through the lower punch body 56. At the same time, the probe return springs 84 will begin to compress until the probe 62 that is carried by the downwardly moving probe holder 60 strikes the workpiece 104 within which there is no hole to be entered. Because the continued downward movement of probe 62 is blocked by contact with workpiece 104, the continued ram pressure against end cap 12 will cause the lower spring 80 to be compressed by means of the upper spring 78 and the plunger 36. In this regard, the lower spring 78 must be sufficiently stiff to resist the probe 62 being forced through the workpiece 104 in which there is no hole to be entered.

As the upper punch body 16 moves downwardly, the upper cam 18 is also moved downwardly so that the roller 26 (of FIG. 2) of the first snap action switch 20 will roll off the raised switching flat 22 and ride over the recessed switching flat 24 (also of FIG. 2). The first switch 20 will then switch from its normally open switch position to a closed switch position. However, because the downward movement of the lower cam 40 with the probe holder 60 is blocked by the probe 62 moving into contact with the solid workpiece 104, the roller 52 (of FIG. 2) of the second snap action switch 42 will stay in place atop the raised switching flat 46 (also of FIG. 2). Thus, the second switch 42 will remain in its normally closed switch position. Inasmuch as each of the first and second switches 20 and 42 now has a closed switch position, the series circuit within which the switches 20 and 42 are connected with plug 30 will have a closed circuit condition so that a current path to ground is established through the plug 30 to the transmitter 70 of FIG. 7.

Figure 8:
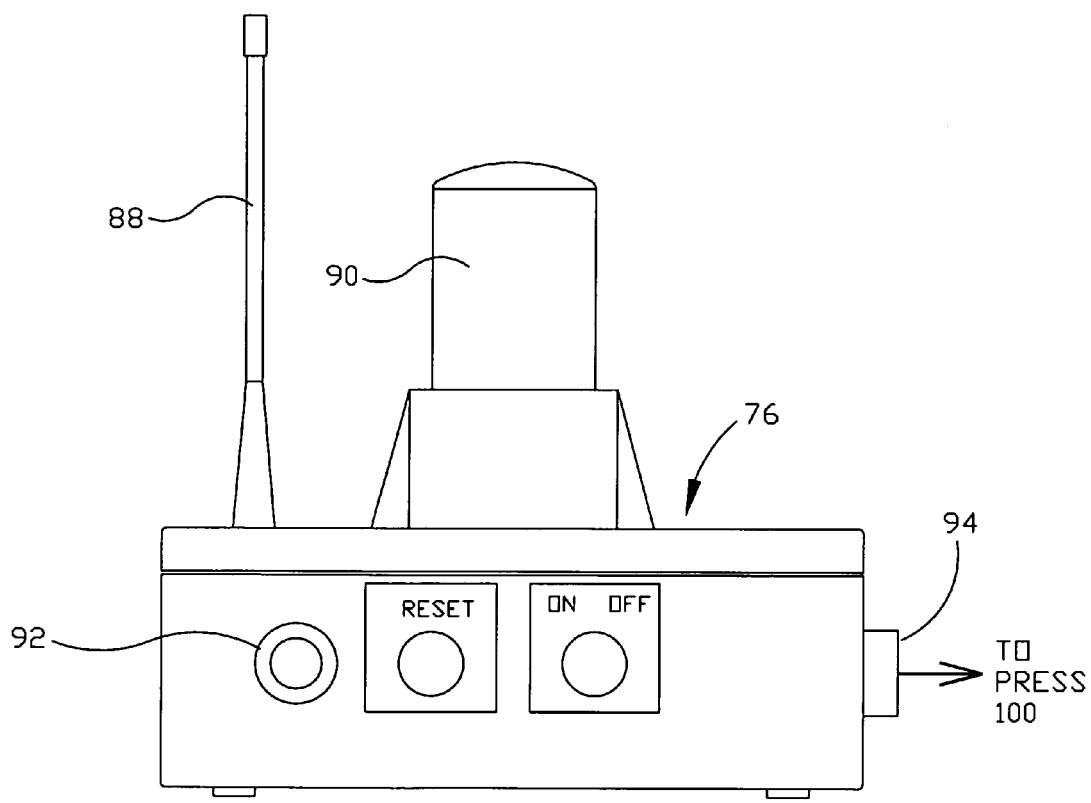
FIG. 8 shows a receiver to receive the signal transmitted by the transmitter of FIG. 7 so as to emit a warning signal in the event of a missing hole condition.

Accordingly, the transmitter 70 will now be enabled so that, as previously described, an RF signal is transmitted (via a wireless communication path) to an antenna 88 of the receiver 76 shown in FIG. 8 to provide a serial stream of data that is indicative of a hole being undersized or missing from or misplaced in the workpiece 104 under test. The receiver 76 includes a set of relays that are selectively closed in response to the data that is transmitted with the signal from transmitter 70. In particular, the receiver 76 may provide a visible warning of a missing or misplaced hole condition by means of a strobe light 90 or the like. Similarly, the receiver 76 can provide an audible warning by means of a buzzer 92 or the like. In this same regard, the receiver 76 can generate an output disable signal by which to shut down the punch press 100 of FIG. 1 and withdraw the ram 112 from end cap 12. To this end, the disable signal can be supplied to the punch press 100 from a plug 94 of the receiver 76 by means of a hardwire connection therebetween (not shown).

The invention claimed is:

1. A missing hole detector to detect a missing or misplaced hole in a workpiece under test, said missing hole detector comprising:
    an end surface to which a pushing force is applied;
    a test probe to be moved towards the workpiece under test in response to the pushing force applied to said end surface;
    a switching circuit responsive to the movement of said test probe toward the workpiece under test, said switching circuit including a first switch having an open switch position when said test probe is moved into the hole and penetrates the workpiece under test in response to the pushing force being applied to said end surface, whereby said switching circuit has a first circuit condition, said first switch having a closed switch position when said test probe is moved into contact with and fails to penetrate the workpiece under test because a hole is absent, whereby said switching circuit has a second circuit condition;
    a first cam having first and second cam surfaces and moving with said test probe relative to said first switch towards the workpiece under test in response to the pushing force applied to said end surface, said first switch having a switch arm that communicates with the first cam surface of said first cam when said test probe is moved into the hole and penetrates the workpiece to cause said first switch to have said open switch position and said switching circuit to have said first circuit condition, the switch arm of said first switch communicating with the second cam surface of said first cam when said test probe fails to penetrate the workpiece because a hole is absent to cause said first switch to have said closed switch position and said switching circuit to have said second circuit condition; and
    a transmitter communicating with said switching circuit and adapted to transmit an output signal when the switching circuit is in the second circuit condition to indicate that the test probe has failed to enter a hole and penetrate the workpiece.

2. The missing hole detector recited in claim 1, further comprising a receiver linked to said transmitter and responsive to the output signal transmitted by said receiver so as to generate a warning signal to indicate that the test probe has failed to penetrate the workpiece under test because a hole is absent.

3. The missing hole detector recited in claim 2, wherein said receiver is linked to said transmitter by way of a wireless communication path.

4. The missing hole detector recited in claim 2, wherein said receiver generates a visible warning signal in response to the output signal transmitted by said transmitter.

5. The missing hole detector recited in claim 2, wherein said receiver generates an audible warning signal in response to the output signal transmitted by said transmitter.

6. The missing hole detector recited in claim 2, wherein the warning signal generated by said receiver in response to the output signal transmitted by said transmitter causes the pushing force applied to said end surface to be terminated.

7. The missing hole detector recited in claim 1, wherein the switch arm of said first switch communicates with the first and second cam surfaces of said first cam by means of a roller carried by said switch arm and adapted to roll over the first and second cam surfaces of said first cam as said first cam and said test probe move relative to said first switch towards the workpiece under test.

8. The missing hole detector recited in claim 7, wherein said switching circuit also includes a second switch connected in electrical series with said first switch and having an open switch position when said test probe is moved into the hole and penetrates the workpiece under test whereby said switching circuit has said first circuit condition, and said second switch has a closed switch position when said test probe fails to penetrate the workpiece because a hole is absent, whereby said circuit has said second circuit condition.

9. The missing hole detector recited in claim 8, further comprising a second cam having first and second cam surfaces and moving with said test probe relative to said second switch towards the workpiece under test in response to the pushing force applied to said end surface, said second switch having a switch arm that communicates with the first cam surface of said second cam when said test probe is moved into the hole and penetrates the workpiece to cause said second switch to have said open switch position and said switching circuit to have said first circuit condition, the switch arm of said second switch communicating with the second cam surface of said second cam when said test probe fails to penetrate the workpiece because a hole is absent to cause said second switch to have said closed switch position and said switching circuit to have said second circuit condition.

10. The missing hole detector recited in claim 9, wherein the switch arm of said second switch communicates with the first and second cam surfaces of said second cam by means of a roller carried by said switch arm and adapted to roll over the first and second cam surfaces of said second cam as said second cam and said test probe move relative to said second switch towards the workpiece under test.

11. The missing hole detector recited in claim 10, wherein the first cam surface of said first cam and the second cam surface of said second cam are raised switching flats, and the second cam surface of said first cam and the first cam surface of said second cam are recessed switching flats.

12. The missing hole detector recited in claim 11, wherein the first cam surface of said first cam is longer than the second cam surface of said second cam.

13. The missing hole detector recited in claim 12, wherein the switch arm of said first switch communicates with the first cam surface of said first cam prior to the application of the pushing force to said end surface and the movement of said test probe towards the workpiece under test, whereby said first switch has said open switch position and said switching circuit has said first circuit condition.

14. The missing hole detector recited in claim 1, further comprising a probe holder carrying said test probe towards the workpiece under test in response to the pushing force applied to said end surface, and at least one probe return spring being compressed to store energy when said probe holder carries said test probe, said probe return spring expanding and releasing its stored energy to drive said probe holder and said test probe away from the workpiece when said pushing force is removed from said end surface.

15. The missing hole detector recited in claim 14, further comprising at least one spring retainer extending between said end surface and said probe holder for transmitting said pushing force applied to said end surface to said probe holder to cause said probe holder and said test probe to move towards the workpiece under test, said spring retainer moving with said probe holder.

16. The missing hole detector recited in claim 15, further comprising at least one probe resisting spring carried by said at least one spring retainer, said probe resisting spring being compressed to prevent said test probe from being pushed through the workpiece under test when said test probe is moved into contact with but fails to penetrate the workpiece because a hole is absent.

17. The missing hole detector recited in claim 1, further comprising an outer casing, said end surface and said test probe being movable relative to said outer casing towards the workpiece under test in response to the pushing force applied to said end surface.

18. A missing hole detector to detect a missing or misplaced hole in a workpiece under test, said missing hole detector comprising:
   a contact face to which a pushing force is applied;
   a test probe to be moved towards the workpiece under test in response to the pushing force applied to said contact face;
   a switching circuit responsive to the movement of said test probe toward the workpiece under test, said switching circuit including a first switch having an open switch position when said test probe is moved into the hole and penetrates the workpiece under test in response to the pushing force being applied to said contact face, whereby said switching circuit has a first circuit condition, said first switch having a closed switch position when said test probe is moved into contact with and fails to penetrate the workpiece under test because a hole is absent, whereby said switching circuit has a second circuit condition; and
   first and second surfaces moving with said test probe relative to said first switch towards the workpiece under test in response to the pushing force applied to said contact face, said first switch having a switch arm communicating with said first surface when said test probe is moved into the hole and penetrates the workpiece to cause said first switch to have said open switch position and said switching circuit to have said first circuit condition, the switch arm of said first switch communicating with said second surface when said test probe fails to penetrate the workpiece because a hole is absent to cause said first switch to have said closed switch position and said switching circuit to have said second circuit condition, said switching circuit producing an output signal when said switching circuit is in the second circuit condition to indicate that the test probe has failed to enter a hole and penetrate the workpiece.

19. The missing hole detector recited in claim 18, wherein said switching circuit also includes a second switch connected in electrical series with said first switch and having an open switch position when said test probe is moved into the hole and penetrates the workpiece under test whereby said switching circuit has said first circuit condition, said second switch having a closed switch position when said test probe fails to penetrate the workpiece because a hole is absent, whereby said switching circuit has said second circuit condition.

20. The missing hole detector recited in claim 19, further comprising third and fourth surfaces moving with said test probe relative to said second switch towards the workpiece under test in response to the pushing force applied to said contact face, said second switch having a switch arm communicating with said third surface when said test probe is moved into the hole and penetrates the workpiece to cause said second switch to have said open switch position and said switching circuit to have said first circuit condition, the switch arm of said second switch communicating with said fourth surface when said test probe fails to penetrate the workpiece because a hole is absent to cause said second switch to have said closed switch position and said switching circuit to have said second circuit condition.

* * * * *